(12) United States Patent
Kuribayashi et al.

(10) Patent No.: US 9,221,347 B2
(45) Date of Patent: Dec. 29, 2015

(54) CHARGING CONTROL SYSTEM, CHARGING CONTROL METHOD, AND RECORDING MEDIUM

(75) Inventors: Ryosuke Kuribayashi, Tokyo (JP); Hitoshi Yano, Tokyo (JP); Koji Kudo, Tokyo (JP); Kazuhiko Ogimoto, Tokyo (JP); Kazuto Kataoka, Tokyo (JP); Takashi Ikegami, Tokyo (JP)

(73) Assignees: NEC Corporation, Tokyo (JP); The University of Tokyo, Tokyo (JP)

( * ) Notice: Subject to any disclaimer, the term of this patent is extended or adjusted under 35 U.S.C. 154(b) by 180 days.

(21) Appl. No.: 14/002,681

(22) PCT Filed: Feb. 10, 2012

(86) PCT No.: PCT/JP2012/053063
§ 371 (c)(1),
(2), (4) Date: Aug. 30, 2013

(87) PCT Pub. No.: WO2012/120965
PCT Pub. Date: Sep. 13, 2012

(65) Prior Publication Data
US 2013/0335033 A1 Dec. 19, 2013

(30) Foreign Application Priority Data
Mar. 4, 2011 (JP) .................. 2011-047839

(51) Int. Cl.
*H02J 7/00* (2006.01)
*B60L 11/18* (2006.01)
(Continued)

(52) U.S. Cl.
CPC ........... *B60L 11/1809* (2013.01); *B60L 11/184* (2013.01); *B60L 11/185* (2013.01);
(Continued)

(58) Field of Classification Search
CPC ................. H01M 10/44; H01M 2010/4271;
H02J 7/007; H02J 7/0047; H02J 7/0021;
H02J 2007/005; H02J 2007/0098; H02J
7/0003; H02J 7/0027; Y02T 10/7005; Y02T
90/14; Y02T 10/7044
USPC .......................................... 320/109, 104, 155
See application file for complete search history.

(56) References Cited

U.S. PATENT DOCUMENTS

2008/0203973 A1  8/2008  Gale et al.
2009/0027056 A1* 1/2009  Huang ................ B60L 11/1857
                                                             324/439
(Continued)

FOREIGN PATENT DOCUMENTS

JP  2000-209707 A  7/2000
JP  2009-100569 A  5/2009
(Continued)

OTHER PUBLICATIONS

International Search Report (ISR) (PCT Form PCT/ISA/210), in PCT/JP2012/053063, dated May 1, 2012.
(Continued)

*Primary Examiner* — Nghia Doan
(74) *Attorney, Agent, or Firm* — McGinn IP Law Group, PLLC

(57) ABSTRACT

A charging control system that controls charging of an automobile that uses electric power as motive power include a receiving unit that receives electric power demands from an electric power supplier side; and a control unit that controls charging on and off of the automobile. The control unit changes a ratio of a charging-on duration and a charging-off duration in each duration in allowable charging durations for the automobile according to changes of the electric power demands over time.

5 Claims, 5 Drawing Sheets

(51) Int. Cl.
  *H01M 10/44*  (2006.01)
  *H02J 3/14*  (2006.01)
  *H02J 7/02*  (2006.01)

(52) U.S. Cl.
  CPC ......... *B60L11/1824* (2013.01); *B60L 11/1842* (2013.01); *B60L 11/1844* (2013.01); *B60L 11/1846* (2013.01); *B60L 11/1848* (2013.01); *H01M 10/44* (2013.01); *H02J 3/14* (2013.01); *H02J 7/0027* (2013.01); *B60L 2230/40* (2013.01); *B60L 2240/72* (2013.01); *B60L 2240/80* (2013.01); *H01M 2220/20* (2013.01); *H02J 7/02* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

2009/0042350 A1* 2/2009 Yang et al. .................... 438/287
2010/0076825 A1* 3/2010 Sato et al. .................... 705/14.1
2010/0292855 A1   11/2010 Kintner-Meyer

FOREIGN PATENT DOCUMENTS

| JP | 2010-004674 A | 1/2010 |
| JP | 2010-081722 A | 4/2010 |
| KR | 101009485 B1 | 1/2011 |
| WO | WO 2010/003711 A1 | 1/2010 |

OTHER PUBLICATIONS

G. K. Venayagamoorthy et. al., "Real-Time Modeling of Distributed Plug-in Vehicles for V2G Transactions", Energy Conversion Congress and Exposition, 2009. ECCE 2009. IEEE, 3937-3941 (2009).
European Search Report dated Apr. 2, 2015.

* cited by examiner

CHARGING CONTROL SYSTEM, CHARGING CONTROL METHOD, AND RECORDING MEDIUM

TECHNICAL FIELD

The present invention relates to a charging control system, a charging control method, and a recording medium for automobile that runs on electricity and hybrid type electric vehicle that runs on the electricity of a rechargeable battery and another power source.

BACKGROUND ART

With the emergence of environmental issues as a serious concern in recent years and with the rapid growth in the installation of renewal power sources such as solar power and aerogenerators, it is believed that this might be an effective approach for realizing a low carbon society and for solving energy resource problems. However, for the present, such renewable electric power sources tend to have large output fluctuations. Thus, from a view point of electric power quality, renewable electric power sources require adjustment means to offset output fluctuations. As such adjustment means, to date, thermal power generators that have high response speeds have been used. Thus, a dilemma may arise in which, as renewable electric power sources are increased, the number of thermal electric power generators that are not environmentally friendly need to be increased as adjustment means that adjusts large output fluctuations of the renewable electric power sources. Thus, a major issue that arises is the need to provide strong adjustment means that can replace thermal electric power generators. As such adjustment means, it may be effective to use large capacity rechargeable batteries (NaS batteries or the like). However, they might have very high barriers to introduction and operation costs of large capacity rechargeable batteries.

Thus, V2G (Vehicle-to-Grid) technologies have been studied in which combinations between many rechargeable batteries in automobiles that run on electricity and chargers connected to the rechargeable batteries are used as a virtual large capacity rechargeable battery for stabilizing an electric power system, and the automobiles that run on electricity as well as renewable electric power sources would rapidly become common (these automobiles including hybrid type electric vehicles that are provided with a rechargeable battery and with another power source are referred to as EVs (Electric Vehicles)). Propositions for V2G itself have been made from the 1980s. Studies for estimation of macroscopic stabilization effects of the entire electric power network have been successively reported. In addition, for several past years, microscopic control techniques that build practical systems, namely technologies that individually control charging and discharging of many EVs in real time have been studied.

For example, Non-Patent Literature 1 describes a charging/discharging control technique that sets up EVs' drive model, electric power distribution network model, and electric power price's time change model so as to perform optimal scheduling based on particle swarm optimization (PSO) inspired by motions of a shoal of fish.

On the other hand, Patent Literature 1 describes the structure of an EV charging scheduling device and also an optimal charging scheduling based on a genetic algorithm.

Generally, a system that not only charges EVs, but also discharges electricity from EVs to the electric power distribution network (electric power system side) is referred to as V2G. However, a system that only charges EVs may be referred to as G2V as distinct from V2G. In G2V, since the number of charging/discharging cycles decreases, the load imposed on the rechargeable batteries of EVs will decrease.

RELATED ART LITERATURE

Patent Literature

Patent Literature 1: JP2000-209707A, Publication

Non-Patent Literature

Non-Patent Literature 1: G. K. Venayagamoorthy et. al., "Real-Time Modeling of Distributed Plug-in Vehicles for V2G Transactions", Energy Conversion Congress and Exposition, 2009. ECCE 2009. IEEE, 3937-3941 (2009).

SUMMARY OF THE INVENTION

Problem to be Solved by the Invention

If a battery controller provided in an EV internally controls the charging speed of a rechargeable battery in future, it is likely that the charging speed could not be successively adjusted from the outside of the EV and that only charging-on state and charging-off state of the rechargeable battery could be controlled from the outside of the EV.

Thus, even if the charging speed of the rechargeable battery of the EV cannot be successively adjusted from the outside of the EV, and even if only the charging-on state and charging-off state can be controlled from the outside of the EV, it is desired that a charging control system is provided which accelerates practical implementation of a many-EV coordination charging system that could become adjustment means against output fluctuations and so forth of renewable electric power sources.

An object of the present invention is to provide a charging control system, a charging control method, and program that could solve the foregoing problems.

Means that Solve the Problem

A charging control system according to the present invention is a charging control system that controls charging of an automobile that uses electric power as motive power, including:
receiving means that receives electric power demands from an electric power supplier side; and
control means that controls charging on and off of said automobile,
wherein said control means changes a ratio of a charging-on duration and a charging-off duration in each duration in allowable charging durations for said automobile according to changes of the electric power demands over time.

A charging control method according to the present invention is a charging control method for a charging control system that controls charging of an automobile that uses electric power as motive power, including:
receiving electric power demands from an electric power supplier side; and
controlling charging on and off of said automobile,
wherein said controlling includes changing a ratio of a charging-on duration and a charging-off duration in each duration in allowable charging durations for said automobile according to changes of the electric power demands over time.

A recording medium according to the present invention is a computer readable record medium that records a program causing a computer that controls charging of an automobile that uses electric power as motive power to execute procedures including:

receiving electric power demands from an electric power supplier side; and controlling charging on and off of said automobile, wherein said controlling includes changing a ratio of a charging-on duration and a charging-off duration in each duration in allowable charging durations for said automobile according to changes of the electric power demands in time.

Effect of the Invention

Since the present invention is structured as described above, even if the charging speed of each EV cannot be successively adjusted from the outside of the EV, but only the charging-on state and charging-off state can be controlled from the outside of the EV, practical implementation of many-EV coordination charging system that could become adjustment means against output fluctuations of renewable electric power sources could be accelerated.

BEST MODE THAT CARRIES OUT THE INVENTION

Next, with reference to the accompanying drawings, an embodiment of the present invention will be described.

Figure 1:
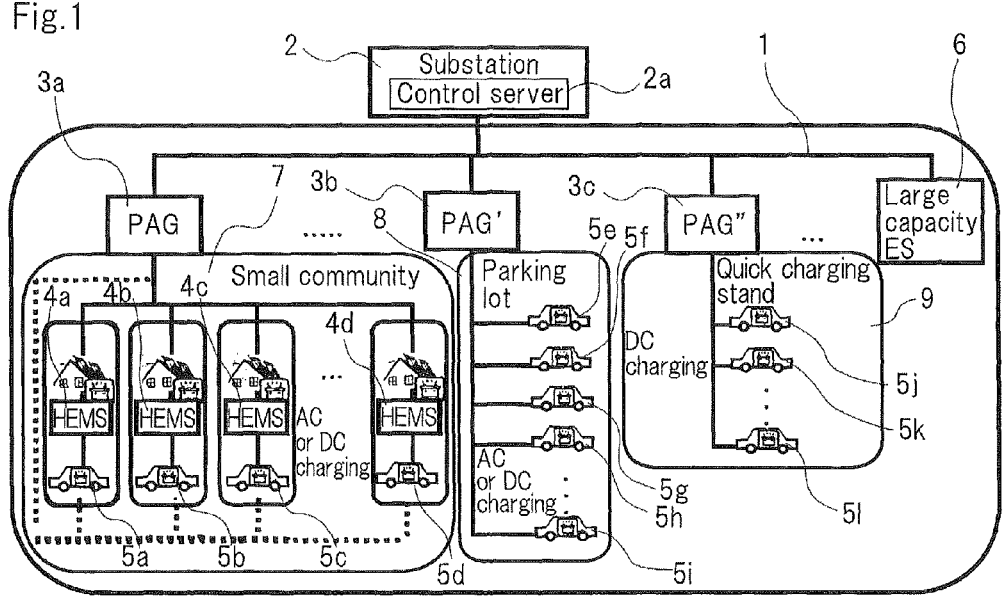
FIG. 1 is a schematic diagram showing the overall structure of an example of a charging environment for electric vehicles using a charging control system according to the present invention.
Figure 2:
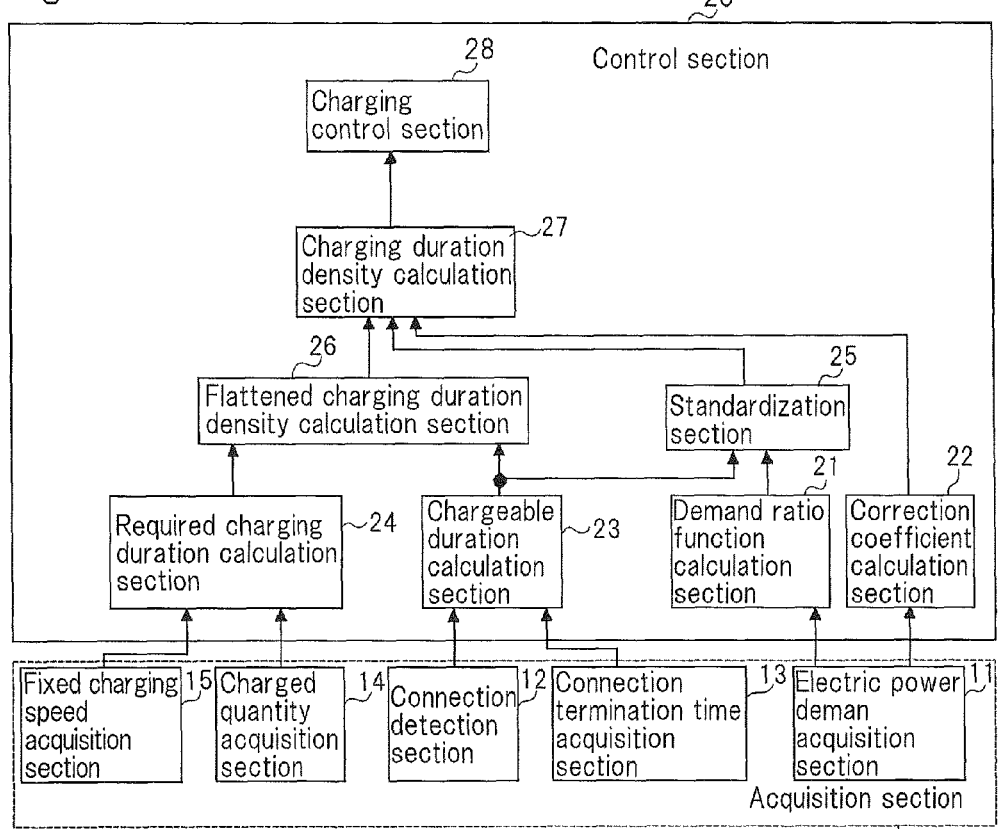
FIG. 2 is a schematic diagram showing the structure of electric power aggregator shown in FIG. 1.

FIG. 1 is a schematic diagram showing an example of an EVs' charging environment that uses a charging control system according to an embodiment of the present invention. FIG. 2 is a schematic diagram showing the structure of electric power aggregators 3a to 3c.

As shown in FIG. 1, in this example of the EVs' charging environment, electric vehicles (EVs) 5a to 5l can be charged at small community 7, parking lot 8, and quick charging stand 9. Electric power aggregators 3a to 3c are located corresponding to small community 7, parking lot 8, and quick charging stand 9, respectively. Electric power aggregators 3a to 3c are connected to substation 2 through electric power distribution network and information communication network 1. Substation 2 is provided with electric power control server 2a. Small community 7 is provided with HEMSs (Home Energy Management Systems) 4a to 4d. Connected to electric power distribution network and information communication network 1 is also large capacity energy storage 6.

As shown in FIG. 2, electric power aggregators 3a to 3c each includes acquisition section 10 and control section 20.

Acquisition section 10 is an example of reception means. Acquisition section 10 includes electric power demand acquisition section 11, connection detection section 12, connection termination time acquisition section 13, charged quantity acquisition section 14, and fixed charging speed acquisition section 15. Acquisition section 10 acquires electric power demands required, for example, by the electric power supplier side.

Control section 20 includes demand ratio function calculation section 21, correction coefficient calculation section 22, chargeable duration calculation section 23, required charging duration calculation section 24, standardization section 25, flattened charging duration density calculation section 26, charging duration density calculation section 27, and charging control section 28.

Control section 20 is an example of control means. Control section 20 controls charging on and off for each EV. In addition, control section 20 changes the ratio of a charging-on duration and a charging-off duration in each duration in chargeable durations for which each EV can be charged according to changes of the electric power demands over time. The chargeable duration is an example of an allowable charging duration for which the EV can be charged.

Flattened charging duration density calculation section 26 is an example of first calculation means. Flattened charging duration density calculation section 26 causes the required charging duration at which the EV is charged into a predetermined charging state (for example, fully charged state) at a charging speed specific to the EV to be divided by the chargeable duration so as to calculate a reference value of the ratio of the charging-on duration and each of the chargeable durations (flattened charging duration density).

Charging duration density calculation section 27 is an example of second calculation means. Charging duration density calculation section 27 causes a demand ratio function based on electric power demands that change time by time to be multiplied by the reference value so as to calculate a setting value of the ratio of the charging-on duration and each of the chargeable durations (charging duration density).

Charging control section 28 is an example of charging control means. Charging control section 28 controls charging on and off for each EV based on the setting value (charging duration density). For example, charging control section 28 causes the unit charging duration (predetermined duration) to be divided by the setting value so as to calculate the period of charging pulses having a pulse width that is the unit charging duration. Charging control section 28 controls charging on and off for each EV corresponding to the period of the charging pulses.

These structural components could be realized by a program implemented in electric power aggregators 3a to 3c. Alternatively, these structural components could be provided to HEMSs 4a to 4d.

In the charging control system having the foregoing structure, electric power aggregators 3a to 3c calculate the chargeable duration when each of EVs 5a to 5l is connected to a charger (electric power distribution network).

Electric power aggregators 3a to 3c control charging on and off for EVs 5a to 5l so as to perform charging scheduling for EVs 5a to 5l such that the charging duration density (=charging-on duration/charging period) becomes constant and equal over all the chargeable time zones, namely, flattening scheduling for charging duration density. The constant charging duration density (flattened charging duration density) calculated by the flattening scheduling is an example of the reference value.

It is assumed that the charging speed in the charging-on state is fixed to a value specific for each EV (charging speed specific to each EV).

In addition, electric power aggregators 3a to 3c acquire an electric power demand that is electric power demand control target data from an electric power supplier (electric power company) side that needs to adjust the electric power supply (for example, electric power control server 2a).

The electric power demand is time series data that reflect both ordinary electric power demand prediction and middle or long term output fluctuation prediction of renewable electric power sources (time series data that reflect middle or long term electric power demands). For example, the electric power demand is data that represent time varying electric power price.

The electric power demand also includes those that occur due to deviations from the original electric power demand scheduling, those that occur in emergency situations such as accidents, and those that suddenly occur due to short term output fluctuations of renewable electric power sources.

Electric power aggregators 3a to 3c generate a ratio function that represents the shape of time changes of the middle or long term required electric power demand using the time series data that reflect the middle or long term electric power demands. In addition, electric power aggregators 3a to 3c generate a real time correction coefficient corresponding to a sudden electric power demand.

Electric power aggregators 3a to 3c causes the constant charging duration density calculated in the flattening scheduling to be multiplied by both the ratio function and the real time correction coefficient so as to modulate the charging duration density. The modulated charging duration density is an example of the setting value.

Electric power aggregators 3a to 3c control turning on or off the charge state of EVs 5a to 5l corresponding to the modulated charging duration density (setting value) in each of the chargeable durations, namely perform charging scheduling. Electric power aggregators 3a to 3c control the rechargeable batteries and chargers of EVs 5a to 5l corresponding to the result of the charging scheduling.

Next, a charging control method for the charging control system having the foregoing structure will be described.

Figure 3A:
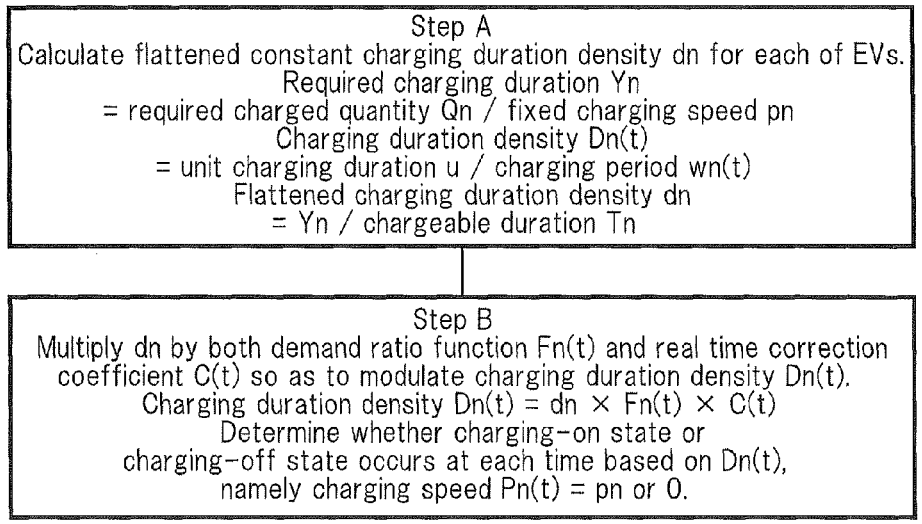
FIG. 3A is a schematic diagram describing an outline of a charging control method for the charging control system.
Figure 3B:
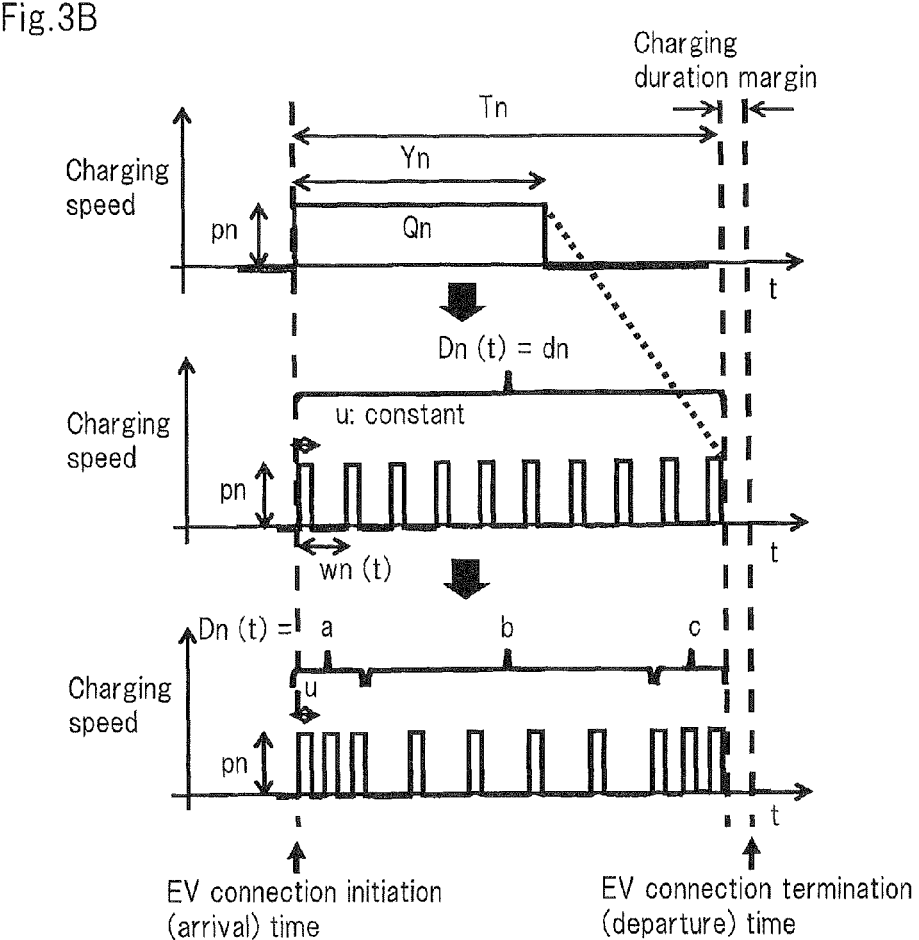
FIG. 3B is a schematic diagram describing an outline of the charging control method for the charging control system.

FIG. 3A and FIG. 3B describe an outline of the charging control method for the charging control system shown in FIG. 2.

At step A, control section 20 calculates flattened constant charging duration density do of each EV.

Here, step A will be described in detail.

When EVs 5a to 5l are respectively connected to chargers (electric power distribution network) at parking lot 8 and so forth, connection detection section 12 detects their connections. Connection termination time acquisition section 13 acquires the scheduled connection termination (departure) time of each of EVs 5a to 5l at each time, namely at intervals of a predetermined duration or at predetermined times.

Chargeable duration calculation section 23 calculates a chargeable duration (allowable charging duration) Tn for each of EVs 5a to 5l at each time based on the scheduled connection termination (departure) time, current time, and desired charging duration margin.

Charged quantity acquisition section 14 acquires charged quantity Qn necessary for a desired charged state (for example, a fully charged state) for each of EVs 5a to 5l at each time. Fixed charging speed acquisition section 15 acquires charging speed pn specific to each of EVs 5a to 5l (specific charging speed) at each time.

Required charging duration calculation section 24 causes charged quantity Qn to be divided by specific charging speed pn for each of EVs 5a to 5l so as to calculate required charging duration Yn that is the minimum duration necessary for each of EVs 5a to 5l becomes a desired charged state (for example, a fully charged state).

Now, it is assumed that squire pulses of charging demand quantity (charging pulses) represented by charging speed pn times unit charging duration (predetermined duration) u are interruptedly arranged so as to achieve required charged quantity Qn.

In addition, an interruption charging period at a particular time is defined as wn(t).

Flattened charging duration density calculation section 26 causes unit charging duration u to be divided by charging period wn(t) at each time for each of EVs 5a to 5l and defines the result as charging duration density Dn(t) at each time. Flattened charging duration density calculation section 26 also causes required charging duration Yn to be divided by chargeable duration Tn so as to calculate a charging duration density that is equal and constant over the chargeable time zone, namely flattened charging duration density dn and defines Dn(t)=dn where n represents ID of each of EVs 5a to 5l.

Thereafter, at step B, control section 20 sets up charging-on state and charging-off state of each of EVs 5a to 5l based on flattened charging duration density dn and the electric power demands.

Now, step B will be described in detail.

Electric power demand acquisition section 11 acquires the foregoing electric power demands from an electric power supplier side that needs to adjust the electric power supply.

Demand ratio function calculation section 21 calculates demand ratio function F'(t) corresponding to time changes of a middle or long term electric power demands of those acquired by electric power demand acquisition section 11.

Standardization section 25 standardizes F'(t) for each of EVs 5a to 5l such that the average value in the chargeable durations becomes "1" and then calculates demand ratio function Fn(t).

Correction coefficient calculation section 22 calculates real time correction coefficient C(t) corresponding to a sudden electric power demand of those acquired by electric power demand acquisition section 11.

Charging duration density calculation section 27 causes flattened charging duration density do to be multiplied by both demand ratio function Fn(t) and real time correction coefficient C(t) so as to modulate charging duration density Dn(t).

Modulating charging duration density Dn(t) means that crowdedness of the foregoing square charging pulses on the time axis is changed corresponding to each of the chargeable durations. The charging speed of each of EVs 5a to 5l is fixed at pn in the charging-on state and at 0 in the charging-off state.

Charging control section 28 causes unit charging duration u to be divided by modulated charging duration density Dn(t) so as to calculate interruption period wn(t) of square charging pulses at each time. Charging control section 28 determines whether the charging-on state or charging-off state occurs at each time, namely charging speed Pn(t) at each time is pn or 0, corresponding to interruption period wn(t) (refer to FIG. 3B).

Demand ratio function Fn(t) is standardized by standardization section 25 such that the average value in the chargeable durations for each of EVs 5a to 5l becomes "1." Real time correction coefficient C(t) calculated by correction coefficient calculation section 22 is a proportional factor in common with EVs 5a to 5l. A multiplication of flattened charging duration density dn by demand ratio function Fn(t) corresponds to "pre-scheduling" performed based on demands made before several hours to several days. A multiplication of flattened charging duration density dn by real time correction coefficient C(t) corresponds to a "real time response" based on demands made immediately before charging control is performed.

While demand ratio function Fn(t) is standardized, real time correction coefficient C(t) may be any value that is not standardized. Thus, if a real time response is performed, an error occurs in total charged quantity Qn. To prevent such an error, immediately after a real time response is performed, it is preferable to perform re-scheduling including the calculation of flattened charging duration density dn.

If the charging duration is permitted to be shortened, re-scheduling may be performed only when the required charging duration is in excess of the chargeable duration.

Thus, while each of EVs 5a to 5l is prevented from being under-charged before it departs, scheduling and real time response for charging speed Pn(t) (=pn or 0) at each time can be performed.

The total charging demand at each time viewed from the electric power distribution network (electric power supplier) side becomes total Ptortal(t) for all EVs 5a to 5l at each time of Pn(t). The foregoing technique allows EV charging demands to be adjusted as adjustment means. As a result, the output fluctuations of the renewable electric power sources can be adequately handled.

Although this embodiment is focused on G2V systems that control only charging to EVs, with an extension in which a minus sign is added to a charging speed, the present invention can be applied to ordinary V2G systems including discharging from EVs.

Next, a practical example of the foregoing charging control method based on simulation results will be described.

Figure 4:
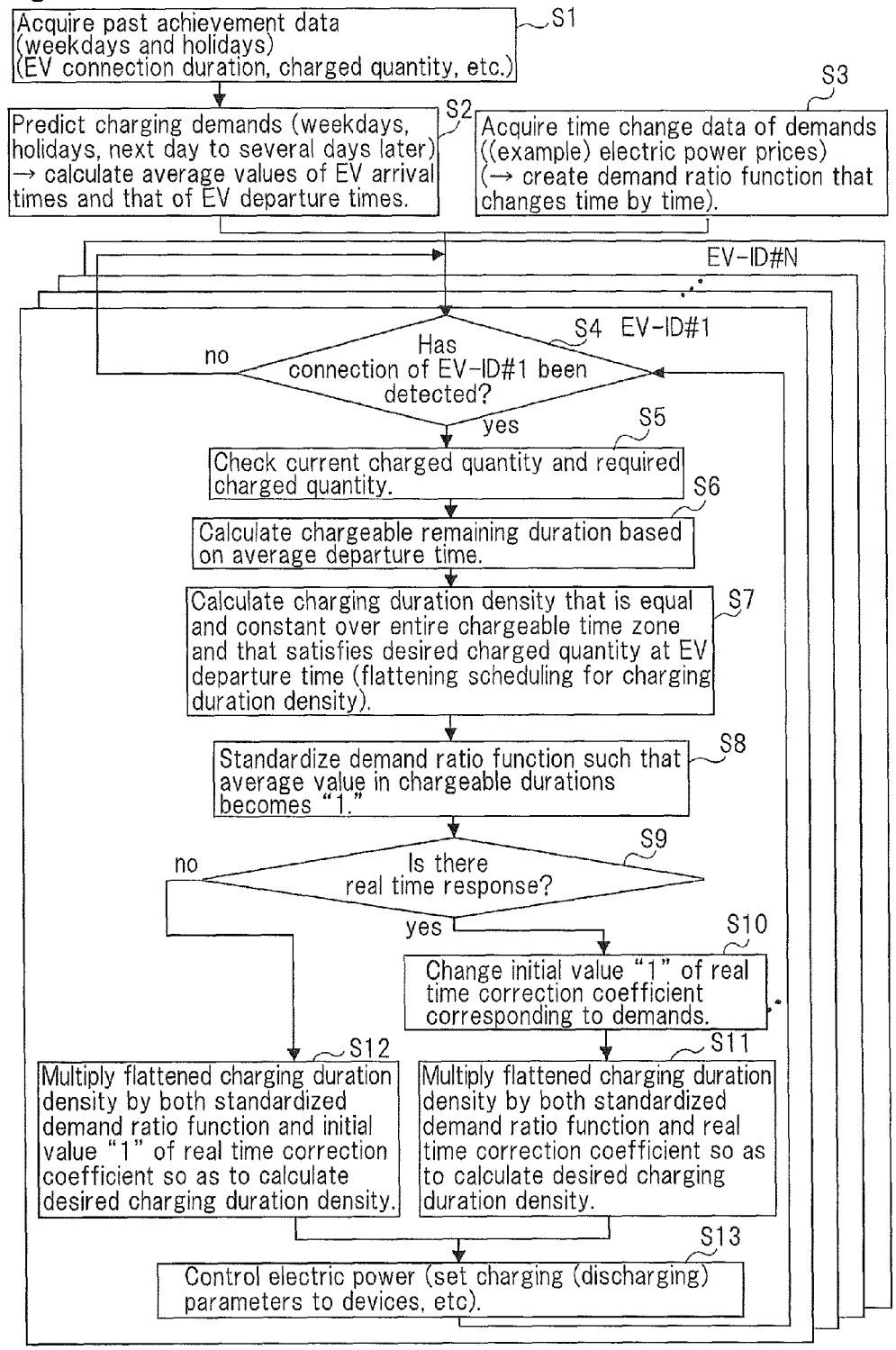
FIG. 4 is a schematic diagram describing an example of the charging control system shown in FIG. 1.

FIG. 4 is a schematic diagram describing a practical example of the charging control method for the charging control system shown in FIG. 1.

First, connection termination time acquisition section 13 acquires past achievement data (both weekdays and holidays) of the charger (electric power distribution network) connection time, charged quantity, and so forth for each of EVs 5a to 5l (at step 1).

Thereafter, connection termination time acquisition section 13 predicts charging demands (weekdays and holidays, next day to several days later) at each time based on the past achievement data and calculates the average values (predicted values) of the arrival (charger connection) times and departure (charger disconnection) times of individual EVs (at step 2).

While connection termination time input section 13 is operating, electric power demand acquisition section 11 acquires time change data of the electric power demands (including electric power prices and so forth) as a charging demand control target from the electric power supplier side. The time change data are electric power demands required by the electric power supplier side.

Thereafter, demand ratio function calculation section 21 calculates demand ratio function F'(t), which changes over time, from these data (at step 3). However, demand ratio function F'(t) has not been standardized in the chargeable duration of each EV, but the function is common to all EVs. In this embodiment, the calculation method of demand ratio function F'(t) is not limited. In this embodiment, demand ratio function F'(t) that has not been standardized is calculated as (maximum electric power price−current electric power price)/(maximum electric power price−minimum electric power price).

Figure 5A:
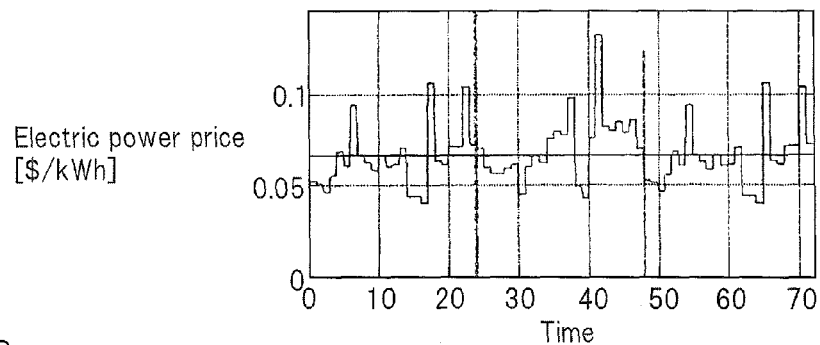
FIG. 5A is a schematic diagram showing data acquired by an electric power demand acquisition section.
Figure 5B:
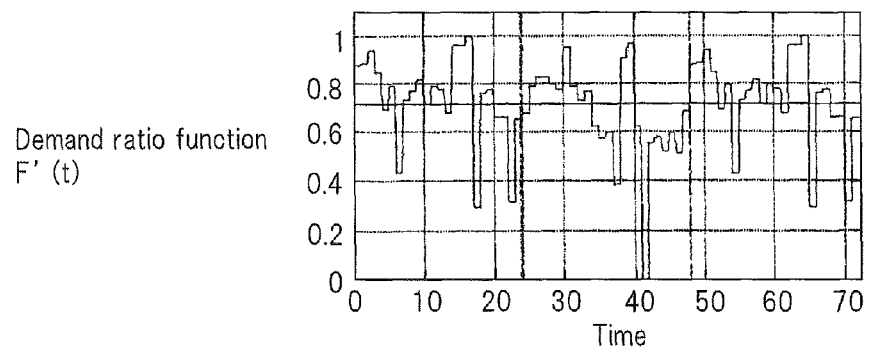
FIG. 5B is a schematic diagram showing demand ratio function F'(t) calculated by a demand ratio function calculation section.

FIG. 5A and FIG. 5B are schematic diagrams describing a process performed by demand ratio function calculation section 21. FIG. 5A is a schematic diagram showing data acquired by electric power demand acquisition section 11. FIG. 5B is a schematic diagram showing demand ratio function F'(t) calculated by demand ratio function calculation section 21.

After connection detection section 12 detects that each EV has been connected to a charger (electric power distribution network) (at step 4), charged quantity acquisition section 14 acquires current charged quantity Zn and required charged quantity Qn for each EV. Fixed charging speed acquisition section 15 acquires fixed charging speed pn for each EV (at step 5).

Thereafter, chargeable duration calculation section 23 calculates chargeable duration Tn that is an assured charger (electric power distribution network) connection duration including a margin based on both the scheduled (estimated) departure time calculated by connection termination time acquisition section 13 and the current time (at step 6). In this simulation, it is assumed that 50 commuting EVs are used (they are driven in the morning and in the evening).

Figure 6:
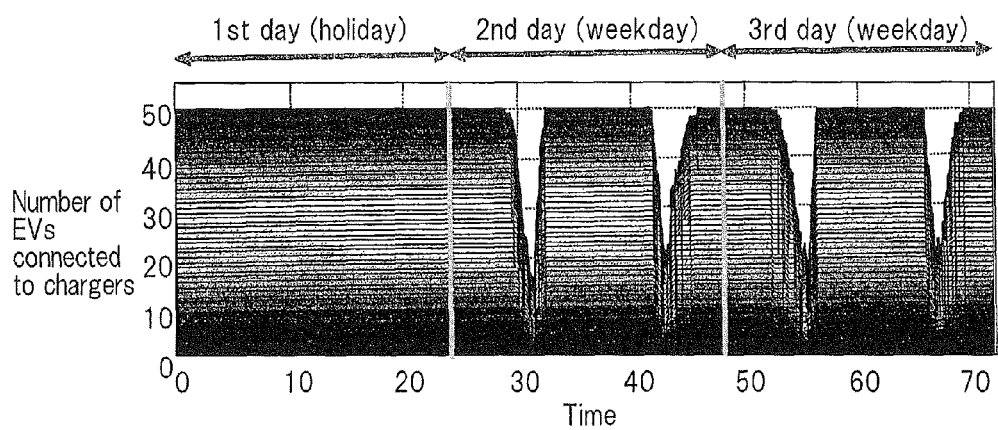
FIG. 6 is a schematic diagram showing an example of a charger connection pattern of 50 EVs.

FIG. 6 is a schematic diagram showing an example of a charger connection pattern of 50 EVs.

According to this embodiment, a random charger (electric power distribution network) connection pattern (three days of one holiday and two weekdays) as shown in FIG. 6 is generated for each EV. It is assumed that in a time zone where each EV is not driven, it is connected to the charger as a charging control target.

Thereafter, required charging duration calculation section 24 causes charged quantity Qn to be divided by specific charging speed pn for each EV so as to calculate required charging duration Yn. Thereafter, flattened charging duration density calculation section 26 causes required charging duration Yn to be divided by chargeable duration Tn for each EV so as to calculate a charging duration density that is equal and constant over the chargeable time zone and that satisfies a desired charged quantity at EV departure time, namely flattened charging duration density dn (at step 7).

Standardization section 25 standardizes F'(t) such that the average value in the chargeable durations becomes "1" and then calculates demand ratio function Fn(t) (at step 8).

Immediately before the charging control is performed, if the electric power supplier side issues a sudden demand change request (at step 9), correction coefficient calculation section 22 changes initial value "1" of real time correction coefficient C(t) of the charging speed to any value corresponding to the demand intensity (at step 10).

Thereafter, charging duration density calculation section 27 causes flattened charging duration density dn to be multiplied by both standardized demand ratio function Fn(t) and real time correction coefficient C(t) so as to calculate charging duration density Dn(t) at each time for each EV (at step 11).

If the electric power supplier side does not issue an sudden demand change request, charging duration density calculation section 27 causes flattened charging duration density do to be multiplied by both standardized demand ratio function Fn(t) and initial value ("1") of real time correction coefficient C(t) so as to calculate charging duration density Dn(t) at each time for each EV (at step 12).

Thereafter, charging control section 28 determines whether the charging-on state or charging-off state occurs at each time for each EV corresponding to charging duration density Dn(t), namely charging speed Pn(t) at each time is pn or 0.

For example, charging control section 28 causes unit charging duration u to be divided by charging duration density Dn(t) so as to calculate the period of charging pulses having a pulse width of unit charging duration u. If the charging pulses having the pulse period occur, charging control section 28 determines that charging speed Pn(t)=pn. If the charging pulses having the pulse width do not occur, charging control section 28 determines that charging speed Pn(t)=0.

Charging control section 28 transfers charging speed Pn(t) to each charger and finally controls each charger, namely electric power demands (at step 13).

Figure 7A:
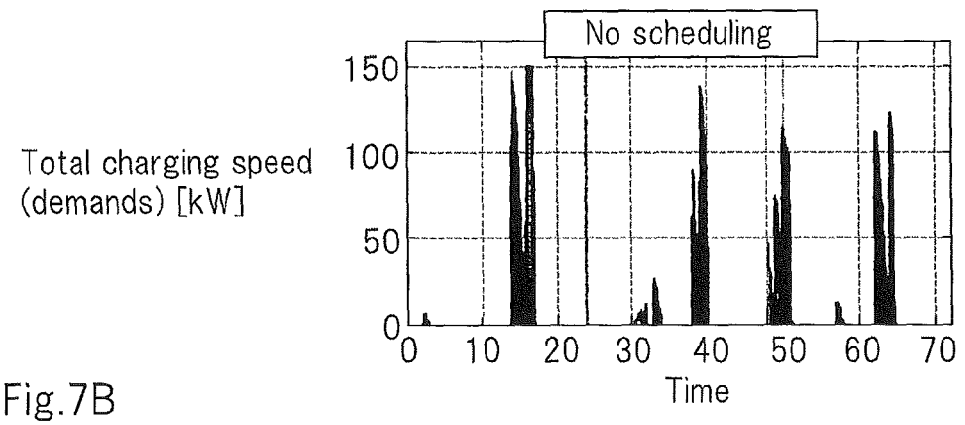
FIG. 7A is schematic diagram showing a simulation result of a shape change of a total charging demand for 50 EVs.
Figure 7B:
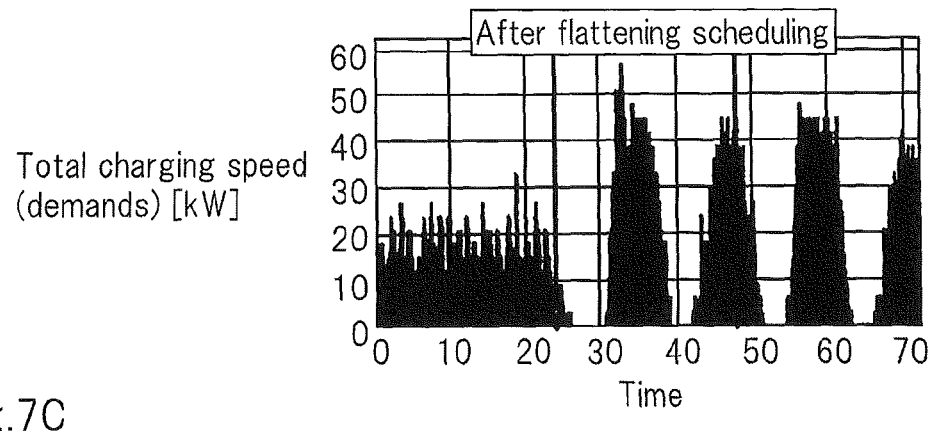
FIG. 7B is schematic diagram showing a simulation result of a shape change of a total charging demand for 50 EVs.
Figure 7C:
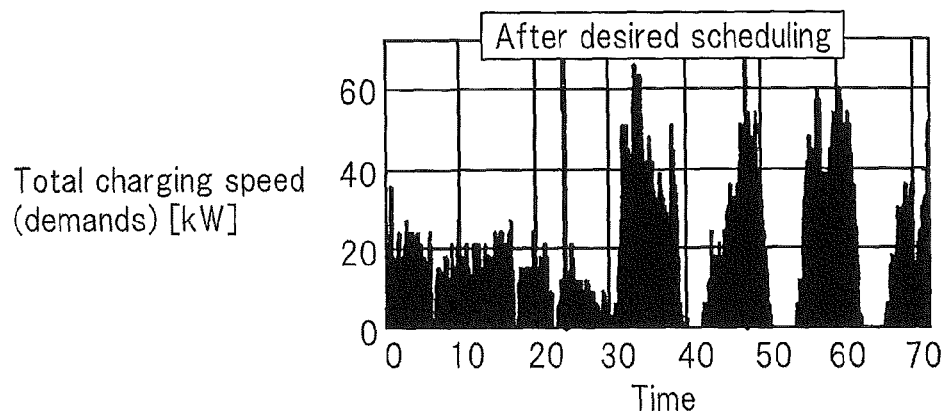
FIG. 7C is schematic diagram showing a simulation result of a shape change of a total charging demand for 50 EVs.

FIG. 7A, FIG. 7B, and FIG. 7C are schematic diagrams showing simulation results of shape changes of total charging demand for 50 EVs. In this example, it is assumed that there is no real time response request and C(t) is 1 over the entire time zone. Unit charging duration u is 0.1 hour in common with all EVs If charging schedule according to this embodiment is not performed, namely each EV owner performs charging scheduling based on electric power price data that change over time such that the charging cost becomes minimal, charging demands concentrate on particular times although they depend on the shape of the starting electric power price curve as shown in FIG. 7A. Thus, the output fluctuations of the renewable electric power sources are not handled, nor it is likely that demands largely fluctuate.

If flattening scheduling according to this embodiment is performed, since there are two driving time zones in each weekday for commuting EVs as shown in FIG. 7B, there are a total of five time zones in three days. However, sharp and large demand fluctuations can be prevented. In addition, flattening scheduling for electric power demands over each time zone can be accurately performed.

In FIG. 7B, the top of the charging demand graph is not perfectly flat over each time zone because charging period wn(t) differs in each EV and an interference phenomenon in which the total charging demand largely fluctuates depending on the relationship of phases of different charging periods of individual EVs occurs.

A tendency that appears in charging demands, like white color noise due to the interference phenomenon, relatively disappear as the number of EVs increases. However, if charging control section 28 actively performs a process that prevents phases of charging periods of individual EVs from being matched in such a manner that the initial phases of charging pulses are shifted or the phases of charging pulses are periodically inverted, even if the number of EVs is small, charging demands could be further flattened.

After charging scheduling according to this embodiment is completed, scheduling accurately representing the shape of demand ratio function F'(t) over each time zone is realized as shown in FIG. 7C. The electric power demand control function of many-EV coordination charging system that can adjust electric power against output fluctuations of the renewable electric power sources can be fulfilled.

It seems that charging control according to this embodiment increases charging cost borne by each EV owner. Actually, however, it is assumed that many-EV coordination charging systems are used in a business model in which the cost of stabilization of the electric power system is fed back from the electric power supplier side to each EV owner through the operator of the many-EV coordination charging system. Thus, the charging cost borne by each EV owner can be rather reduced.

In addition, since the initial value "1" of C(t) is changed to any value in real time, a "real time response" to a sudden electric power demand increase/decrease request can be made.

However, a real time response may cause total charged quantity Qn to deviate from the value that has been pre-scheduled. Thus, it is preferable to perform charging scheduling including re-flattening scheduling for charging duration density in real time immediately after a real time response so as to compensate for the deviation. As a result, each EV can be charged in the desired charged quantity at its departure time.

In the charging scheduling according to this embodiment, a spike of charging demands tends to occur at an edge of each charging time zone and immediately after a real time response because phases of charging periods of a plurality of EVs are matched. However, if charging control section 28 actively performs a process that prevents phases from being matched in such a manner that the initial phases of charging pulses are shifted or the phases of charging pulses are periodically inverted, such a spike could be prevented from occurring.

Next, effects of this embodiment will be described.

Each EV can be charged in the desired quantity (for example, fully charged) at its departure time. This is because flattened charging duration density do that remains in the chargeable duration is multiplied by demand ratio function Fn(t) standardized such that the average value in the chargeable durations becomes "1" and re-scheduling including flattening charging duration density is performed even if a real time response is made to a sudden demand change request. Thus, even if any electric power demand occurs, the total charging demand does not change from the initial scheduling in which EVs were connected to respective chargers.

In addition, limited EVs located at parking lots and so forth can be prevented from being charged (load imposed on batteries of EVs and charging infrastructure can be distributed and minimized). This is because the charging duration density of all EVs is equally multiplied by both demand ratio function Fn(t) and real time correction coefficient C(t).

In addition, a real time request to adjustment means (demand change request) can be handled. This is because this embodiment is based on flattening scheduling for charging duration density (electric power demands) at which chargeable durations for EVs are maximally used so as to maximize the degree of freedom of shifting the charging times. In addition, the charging speed of each EV is decided in real time in such a manner that a correction coefficient is used besides middle or long term "pre-scheduling" so as to improve response to a real time request without a redundant calculation process that controls chargers.

In addition, scheduling can be optimized by a low load calculation process. This is because desired scheduling can be nearly completed only by multiplying flattened charging duration density do by both demand ratio function Fn(t) and correction coefficient C(t) like mold casting.

In addition, scalability for EVs can be ensured (a transition from one EV to an increased number of EVs). This is because this embodiment is based on scheduling for individual EVs.

In addition, even if the charging speed for each EV cannot be successively adjusted from the outside, the total charging demand of all EVs can be controlled. This is because only charging-on state and charging-off state of each EV are adjusted instead of successive adjustment of charging speed so as to change the total charging demand of all EVs.

Thus, the multiple EV coordination charging (G2V) system that adjusts electric power against output fluctuations and so forth of the renewable electric power sources can be further accelerated.

According to the present invention, processes of electric power alligators 3a to 3c may be realized by other than dedicated hardware. In other words, a program that realizes the functions of electric power aggregators 3a to 3c may be recorded on a recording medium from which electric power alligators 3a to 3c can read the program. Electric power alligators 3a to 3c may read the program from the recording medium and execute the program. The recording medium from which electric power alligators 3a to 3c reads the program is, for example, a movable recording medium such as an IC card, a memory card, a floppy disk (registered trademark), a magneto-optical disc, a DVD, or a CD or an HDD built in each of electric power alligators 3a to 3c. The program recorded on the recording medium may be read for example by a control block and the foregoing process may be performed under the control of the control block.

With reference to the foregoing embodiment, the present invention has been described. However, it should be understood by those skilled in the art that the structure and details of the present invention may be changed in various manners without departing from the scope of the present invention.

According to the foregoing embodiment, the width of charging pulses is fixed. Alternatively, the width may be changed corresponding to electric power demands that change over time. For example, charging control section 28 may widen the width of charging pulses as the electric power demands increase.

The present application claims a priority based on Japanese Patent Application JP 2011-047839 filed on Mar. 4, 2011, the entire contents of which are incorporated herein by reference in its entirety.

DESCRIPTION OF REFERENCE NUMERALS

1 Electric power distribution network and information communication network
2 Substation
2a Electric power control server
3a to 3c Electric power alligators
4a, 4b, 4c, 4d HEMSs
5a to 5l Electric vehicles EV
6 Large capacity energy storage
7 Small community
8 Parking lot
9 Quick charging stand
10 Acquisition section
11 Electric power demand acquisition section
12 Connection detection section
13 Connection termination time acquisition section
14 Charged quantity acquisition section
15 Fixed charging speed acquisition section
20 Control section
21 Demand ratio function calculation section
22 Correction coefficient calculation section
23 Chargeable duration calculation section
24 Required charging duration calculation section
25 Standardization section
26 Flattened charging duration density calculation section
27 Charging duration density calculation section
28 Charging control section

What is claimed is:

1. A charging control system that controls charging of an automobile that uses electric power as motive power, comprising:
a receiving unit that receives electric power demands from an electric power supplier side; and
a control unit that controls charging on and off of said automobile,
wherein said control unit changes a ratio of a charging-on duration and a charging-off duration in each duration in allowable charging durations for said automobile according to changes of said electric power demands over time,
wherein said control unit includes:
a first calculation unit that causes a required charging duration at which said automobile is charged in a predetermined charged state at a specific charging speed of said automobile to be divided by each of said allowable charging durations so as to calculate a reference value of the ratio of said charging-on duration and each of said allowable charging durations;
a second calculation unit that causes a demand ratio function based on time changes of said electric power demands to be multiplied by said reference value so as to calculate a setting value of the ratio of said charging-on duration and each of said allowable charging durations; and
a charging control unit that controls charging on and off based on said setting value.

2. The charging control system as set forth in claim 1, wherein said charging control unit causes said setting value to be divided by a predetermined duration so as to calculate a period of charging pulses having a pulse width of said predetermined duration and controls charging on and off corresponding to the period of the charging pulses.

3. The charging control system as set forth in claim 1, wherein if a sudden electric power demand that changes over time occurs on said electric power supplier side, said second calculation unit causes a correction coefficient corresponding to the electric power demand to be divided by both said demand ratio function and said reference value so as to calculate said setting value.

4. A charging control method for a charging control system that controls charging of an automobile that uses electric power as motive power, comprising:
receiving electric power demands from an electric power supplier side; and
controlling charging on and off of said automobile,
wherein said controlling includes changing a ratio of a charging-on duration and a charging-off duration in each duration in allowable charging durations for said automobile according to changes of said electric power demands over time,
wherein said controlling further includes:
causing a required charging duration at which said automobile is charged in a predetermined charged state at a specific charging speed of said automobile to be divided by each of said allowable charging durations so as to calculate a reference value of the ratio of said charging-on duration and each of said allowable charging durations;
causing a demand ratio function based on time changes of said electric power demands to be multiplied by said reference value so as to calculate a setting value of the ratio of said charging-on duration and each of said allowable charging durations; and
controlling charging on and off based on said setting value.

5. A computer readable recording medium that records a program causing a computer that controls charging of an automobile that uses electric power as motive power to execute procedures comprising:
- receiving electric power demands from an electric power supplier side; and
- controlling charging on and off of said automobile,
- wherein said controlling includes changing a ratio of a charging-on duration and a charging-off duration in each duration in allowable charging durations for said automobile according to changes of said electric power demands over time,
- wherein said controlling further includes:
  - causing a required charging duration at which said automobile is charged in a predetermined charged state at a specific charging speed of said automobile to be divided by each of said allowable charging durations so as to calculate a reference value of the ratio of said charging-on duration and each of said allowable charging durations;
  - causing a demand ratio function based on time changes of said electric power demands to be multiplied by said reference value so as to calculate a setting value of the ratio of said charging-on duration and each of said allowable charging durations; and
  - controlling charging on and off based on said setting value.

* * * * *